Patented May 9, 1939

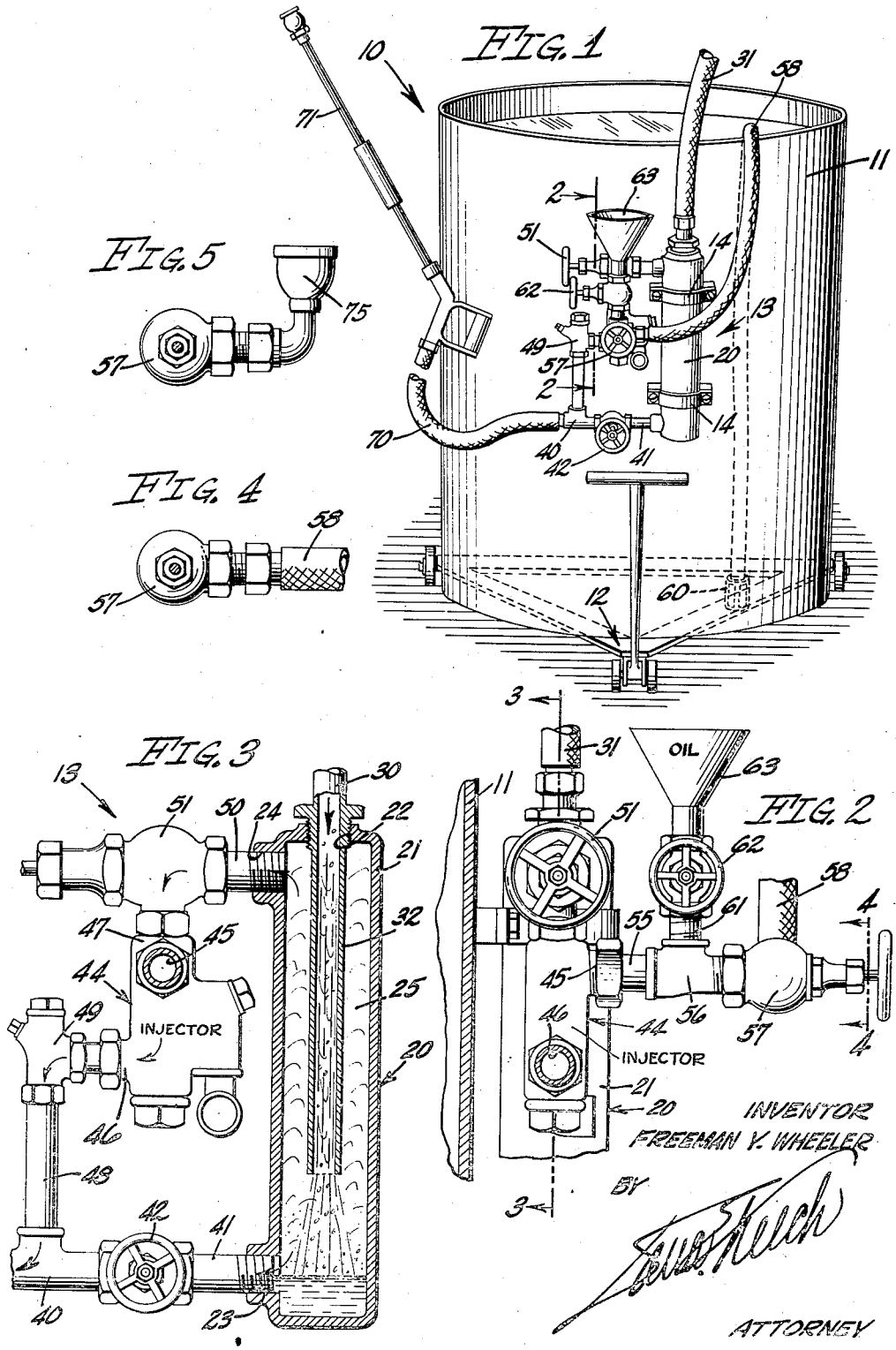

2,157,581

UNITED STATES PATENT OFFICE 2,157,581

APPARATUS FOR PRODUCING A SPRAY

Freeman Y. Wheeler, Beverly Hills, Calif., assignor to Clayton Manufacturing Company, Alhambra, Calif., a corporation of California Application October 26, 1936, Serial No. 107,549

8 Claims. (Cl. 299—84)

My invention relates to apparatus for producing sprays including a detergent for the purpose of performing a cleaning operation.

The present invention has for its object the provision of an apparatus for producing a spray in which steam is employed for directing detergent against a surface to be cleaned, and which will eliminate the need of pumps to deliver the detergent into the steam line.

In conducting cleaning operations of the general nature above referred to, the steam supplied by the only available source is often steam at low pressure and containing considerable water, this being known as "wet" steam.

It is an object of my invention to provide such an apparatus which is capable of operating satisfactorily with wet steam.

As it is sometimes desirable on short notice to cut into the steam line a quantity of oil to assist in the cleaning work, it is a further object of my invention to provide such an apparatus which will permit this to be done.

I have found in using steam injectors that the inner parts of these become coated with lime or the like which is deposited thereon by the water passing through the injector. I find that it has been the custom to disassemble these injectors in order to clean the parts thus coated. This, however, requires considerable time and during this period lays up the apparatus from which the injector was removed to be cleaned.

It is therefore a further object of my invention to provide an apparatus for quickly cleaning a steam injector, and particularly the inner parts thereof.

The manner of accomplishing the foregoing objects and advantages will be made manifest in the following description taken in connection with the accompanying drawing, in which:

Fig. 1 is a front perspective view of a preferred embodiment of the apparatus of my invention.

Fig. 2 is an enlarged cross sectional view taken on the line 2—2 of Fig. 1.

Fig. 3 is a sectional view taken on the line 3—3 of Fig. 2, the piping, valves and injector shown therein being in elevation.

Fig. 4 is a fragmentary sectional view taken on the line 4—4 of Fig. 2, illustrating the detergent hose connection with the detergent control valve.

Fig. 5 is a view similar to Fig. 4, illustrating the acid cup of my invention connected, in the place of the detergent hose, to the valve shown in Fig. 4.

Referring specifically to the drawing, an apparatus 10 comprising a preferred embodiment of the apparatus of my invention is shown in Fig. 1, this apparatus including an open detergent reservoir tank 11, a wheel carriage 12 and a steam and detergent mixing unit 13. The tank 11 is securely mounted on the carriage 12, and the unit 13 is secured by clamps 14 to the wall of the tank 11.

The unit 13 includes a steam separator 20 which is gripped by the clamps 14 and by which the unit 13 is supported, said separator having a shell 21 provided with a wet steam inlet opening 22, a water-and-wet-steam outlet opening 23, and a dry steam outlet opening 24, there being a steam separating chamber 25 formed within the shell 21. Screwed into the wet steam inlet opening 22 is a wet steam hose nipple 30 to which a wet steam hose 31 connects, this nipple having a steam delivery tube 32 which extends downwardly into the chamber 25 as shown in Fig. 3.

Connecting the water-and-wet-steam outlet 23 with a steam and detergent mixing pipe 40 is a pipe 41 having a valve 42. Included in the unit 13 is a steam injector 44 of the standard well Penberthy type commonly used in injecting water into boilers, this injector having a water inlet 45, a water-under-pressure outlet 46, and a steam inlet 47. The water-under-pressure outlet 46 is connected by a pipe 48, having a check valve 49, with the detergent and steam mixing pipe 40. The dry steam outlet 24 of the separator 20 is connected by a pipe 50 having a valve 51 with the steam inlet 47 of the injector 44. The water inlet 45 of the injector 44 is connected by a pipe 55 having a reducing nipple 56 and a valve 57 with a detergent intake hose 58, said hose having at its lower end a caged screen 60. Connected to the nipple 56 by a pipe 61 having a valve 62 is a funnel 63, the purpose of which will be made manifest hereinafter.

Connecting onto the discharge end of the steam and detergent mixing pipe 40 is a nozzle hose 70 having a nozzle 71.

Operation

We shall assume that when starting, all valves are closed; the tank 11 contains a supply of primary detergent such as soap solution; and a suitable head of steam, of from ten to two hundred pounds pressure per square inch is present in the hose 31.

The operation of the apparatus 10 begins with the placing of a suitable quantity of detergent in the tank 11, Fig. 1 showing the tank as substantially filled. It is to be understood, however, that it is not necessary for the tank 11 to be filled with detergent as the apparatus 10 will operate as long as there is sufficient detergent in the tank 11 to cover the screen 60. The valves 51 and 57 and 42 are now opened. This causes a flow of steam downwardly through the separator 20, any water in the steam being deposited in the lower end of the chamber 25, the dry steam passing upwardly in this chamber and out through the pipe 50 and valve 51 into the injector 44, through which the steam passes. This steam leaves the injector 44 at the water-under-pressure outlet 46, from which it passes downwardly through the pipe 48 into the steam and detergent mixing pipe 40. Steam, carrying with it any water collected in the bottom of collector 20, is at the same time delivered through the pipe 41 and valve 42 into the mixing pipe 40. Everything discharged into the mixing pipe 40, of course, passes immediately into the hose 70 and is discharged therefrom through the nozzle 71.

My present best understanding of the operation of the injector 44 is as follows: this injector may be a standard Penberthy injector, such as is well known in the art and which is commonly used for the injecting of water into boilers where the injector is actuated by steam delivered from the boiler into which the injector forces water. As the steam passes from the upper end of the chamber 25 and through the nipple 50 and valve 51 into the steam inlet 47 of the injector 44 this steam passes through a small nozzle and expands in a confined space to a pressure which is less than atmospheric, thereby causing liquid detergent to be sucked up through the hose 58 and inwardly through the water inlet 45 of the injector into this confined space. This liquid detergent, which is many times the weight of the steam involved, condenses the steam, and the resulting mixture, which is now hot detergent solution, thereby acquires enough energy from the latent heat of vaporization of the steam to build up a pressure greater than the initial steam pressure in the pipe 30 and thus force its way into the detergent pick-up pipe 40.

After being thus discharged from the injector into the pick-up pipe 40 the detergent is there mixed with the steam and water admitted into this mixing pipe through the valve 42. Owing to the relatively high speed with which this steam travels through the pipe 40 the steam, water and detergent are thoroughly mixed and ultimately discharged from the nozzle 71 in the form of a spray. The volume and velocity of this spray is determined by the pressure of the steam delivered to the separator 20 by the hose 31 and by the degree to which the valve 42 is opened. The quantity of the detergent contained in said spray depends upon the amount which the valves 51 and 57 are opened.

As above pointed out, the valve 62 is normally closed. Occasionally an auxiliary detergent is required on some particular cleaning job, and it is necessary either that the steam discharged from the nozzle 71 carry a mixture of the primary detergent with said auxiliary detergent, or else that the auxiliary detergent be entirely substituted for the primary detergent. To accomplish the mixing of an auxiliary detergent with the primary detergent, the auxiliary detergent is poured into the funnel 63 and the valve 62 is opened, the proportion of the auxiliary detergent to primary detergent being determined by regulation of the valves 62 and 57. If auxiliary detergent alone is desired, the valve 62 is opened and the valve 57 is shut off. The usual auxiliary detergent admitted through the funnel 63 is a cleaning oil which operates as a solvent when carried in a blast of steam from the nozzle 71 against the surface to be cleaned.

As shown in Fig. 3, any water in the wet steam entering the separator 20 is deposited at the lower end of the separator and flows through the pipe 41 and valve 42 into the steam and detergent mixing pipe 40, this water being formed into a fine mist or spray as it is discharged from the nozzle 71.

In the operation of the apparatus 10, I have found it necessary to develop a method of cleaning the injector 44, as a deposit tends to accumulate on the inner working surfaces thereof which interferes with the proper operation of the injector. The method which I have thus evolved consists in introducing into the injector in the place of the water or detergent to be ejected thereby, a quantity of acid or the like which will cut the deposit on the working surfaces of the injector and leave these clean. The apparatus I have developed for performing this method comprises an acid cup 75, see Fig. 5, which is adapted to be connected with the valve 57 in the place of the hose 58. Whenever it is necessary to clean the injector 44, this substitution is made and a quantity of muriatic acid is then poured into the cup 75 and this is allowed to be drawn into the injector 44 while the apparatus 10 is operating. This acid, as it travels through the injector 44, is spread over the working surfaces thereof, and attacks the deposit on these surfaces so as to cause these to be loosened and removed by the stream of steam passing through the injector. When this injector cleaning operation is completed, the cup 75 is removed from the valve 57 and the hose 58 again connected to the latter and the apparatus 10 is again ready for regular operation. During the cleaning of the injector, the spray emitted from the nozzle 71 is, of course, discharged down a sewer or some place where the acid contained in it will have no harmful effect.

One of the advantageous features of the apparatus 10 is that the screen 60 may be placed either in the detergent tank 11, or in any container having therein a detergent which it is desired to apply momentarily in the cleaning operations being conducted by the spray emitted from the nozzle 71.

It is also to be noted that the primary detergent in the tank 11 does not have to be held under pressure, and that this not only dispenses with the necessity of an expensive pressure tank to hold the detergent, but greatly simplifies the work of the operator in observing the quantity of detergent in the tank and renewing this supply when necessary.

What I claim is:

1. In a cleaning apparatus the combination of: a steam-pipe; a liquid detergent reservoir; a detergent pick up pipe; a steam injector having a steam inlet, a water inlet, and a water-under-pressure outlet; a valved tube connecting the water inlet of said injector to said reservoir; a pipe connecting the water-under-pressure outlet of said injector with said detergent pick up pipe; a steam separator, having a wet steam inlet, a water-and-wet-steam outlet and a dry steam outlet; means connecting said wet steam inlet to said steam pipe; means connecting said dry steam outlet to the steam inlet of said injector; and means connecting said water-and-wet-steam outlet of said separator to said detergent pick up pipe.

2. In a cleaning apparatus the combination of: a steam pipe; a liquid detergent reservoir; a detergent pick up pipe; a steam injector having a steam inlet, a water inlet, and a water-under-pressure outlet; a valved tube connecting the water inlet of said injector to said reservoir; a pipe connecting the water-under-pressure outlet of said injector with said detergent pick up pipe; a steam separator, having a wet steam inlet, a water-and-wet-steam outlet and a dry steam outlet; means connecting said wet steam inlet to said steam pipe; valved means connecting said dry steam outlet to the steam inlet of said injector; and valved means connecting said water-and-wet-steam outlet of said separator to said detergent pick up pipe.

3. In a cleaning apparatus the combination of: a steam pipe; a liquid detergent reservoir; a detergent pick up pipe; a steam injector having a steam inlet, a water inlet, and a water-under-pressure outlet; a valved tube connecting the water inlet of said injector to said reservoir; check valve means connecting the water-under-pressure outlet of said injector with said detergent pick up pipe; a steam separator, having a wet steam inlet, a water-and-wet-steam outlet and a dry steam outlet; means connecting said wet steam inlet to said steam pipe; valved means connecting said dry steam outlet to the steam inlet of said injector; and valved means connecting said water-and-wet-steam outlet of said separator to said detergent pick up pipe.

4. A combination as in claim 1 having means for introducing cleaning oil and the like at the option of the operator into the water inlet of said injector.

5. A combination as in claim 1 in which said steam separator comprises means forming an elongated vertically disposed chamber, a tube connected to the wet steam inlet and extending downwardly a substantial distance in said chamber, means forming the wet steam and water outlet at the lower end of said chamber; and means forming the dry steam outlet at the upper end of said chamber.

6. A combination as in claim 1 in which said liquid detergent reservoir comprises an open tank and the balance of this combination is mounted on a side wall of said tank, the aforesaid tube connecting the water inlet of said injector to said reservoir comprising a flexible hose having a screen on its inner end.

7. In an apparatus for producing a spray the combination of: means for confining and conducting a continuous stream of wet steam to a given point and for releasing said stream of steam from confinement at this point and discharging said stream as a spray at a relatively high velocity; means forming a liquid detergent reservoir; a steam operated water injector; means for connecting the water inlet of said injector to said detergent reservoir; means for connecting the water outlet of said injector with said first above mentioned means; and means for separating relatively dry steam from said wet steam in said first above mentioned means at a point in advance of its aforesaid connection with the water outlet of said injector, and delivering said dry steam so diverted to the steam inlet of said injector to operate the same to draw liquid detergent from said reservoir and inject the same through the water outlet of said injector into said first above mentioned means.

8. In an apparatus for producing a spray, the combination of: a steam separator provided with an inlet, a dry steam outlet and a wet outlet; an injector provided with a steam inlet, a liquid inlet, and a liquid outlet; a valved conduit connecting the dry outlet of the separator with the steam inlet of the injector; valved means for supplying treating liquid to the liquid inlet of the injector; a discharge line; a conduit provided with a control valve connecting said discharge line with the wet outlet of said separator; and pipe means carrying a check valve connecting the liquid outlet of the injector with the discharge line at a point beyond said control valve.

FREEMAN Y. WHEELER.